Dec. 12, 1939.   J. J. RAWLINGS   2,183,466
PERCUSSION DRILL
Filed Sept. 30, 1937    2 Sheets-Sheet 1
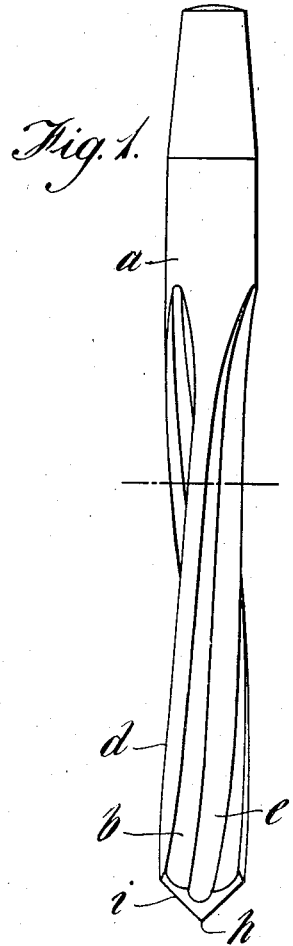
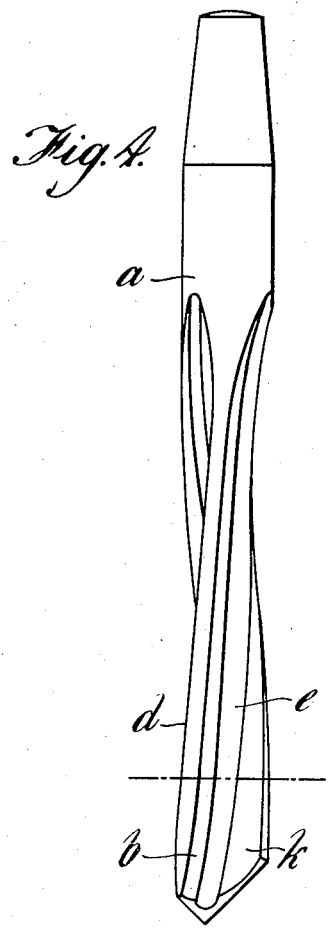
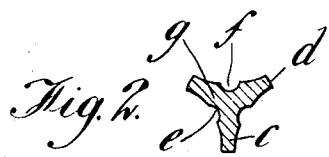
INVENTOR
JOHN J. RAWLINGS
By Norris & Bateman
ATTORNEYS Dec. 12, 1939.  J. J. RAWLINGS  2,183,466
PERCUSSION DRILL
Filed Sept. 30, 1937   2 Sheets-Sheet 2

INVENTOR
JOHN J. RAWLINGS
By Norris & Bateman
ATTORNEYS

Patented Dec. 12, 1939

2,183,466

UNITED STATES PATENT OFFICE 2,183,466

PERCUSSION DRILL

John Joseph Rawlings, London, England, assignor to The Rawlplug Company Limited, London, England Application September 30, 1937, Serial No. 166,688
In Great Britain March 17, 1937

5 Claims. (Cl. 255—63)

This invention relates to percussion drills for drilling holes in masonry operated either manually or by power hammer in which the drill is rotated in the interval between successive blows, simultaneously with the delivery of blows, or continuously, so that the position of the cutting edges of the drill is constantly changing with respect to the face of the material on which it is operating.

It is known that rapid drilling in such circumstances can be obtained by using a drill with two, or preferably more, flutes, if such flutes are very deep and the ribs or lands of the drill are thin, but such a drill rapidly becomes worn in use, the diameter quickly becoming progressively smaller so that a number of holes of a specified diameter can only be made by using a number of different drills.

In the improved drill, according to this invention, deep flutes are formed having grooves cut in the bottom parts thereof by making successive cuts with milling cutters of different curvatures. The flutes thus produced may be of different depths so that the core or centre of inertia of a cross section of the drill is removed from the geometrical centre or centre of the envelope circle of the edges of the flutes.

In a drill so formed, the blows which are communicated to the drill by the manually operated or power hammer on the geometrical centre of the shank cause a vibratory action of the drill, thus causing the latter to make a hole of greater clearance than would result from the use of a symmetrically fluted drill and this in itself results in less rapid wear on the outer edges or lands of the drill.

In the accompanying drawings:

Figure 1 is a side elevation of a drill made in accordance with the invention.

Figure 2 is a transverse section on the line 2—2, Figure 1,

Figure 3 is an end view of the drill shown in Figure 1,

Figure 4 is a side elevation of an improved drill in which the core of the drill is eccentric to the outer surfaces or envelope of the ridges or lands, Figure 5 is a transverse section on the line 5—5, Figure 4, Figure 6 is an end view of the drill shown in Figure 4, Figures 7 and 8 are transverse sections illustrating alternative forms of grooves or flutes to that shown in Figure 1.

Figure 7:
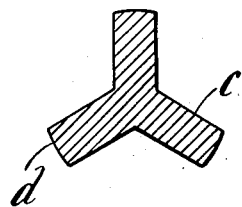
Figure 8:
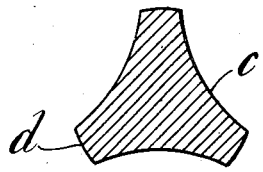
Figure 9:
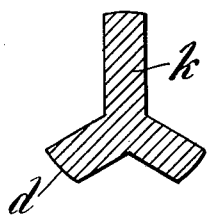
Figures 9 and 10 are transverse sections illustrating alternative forms of grooves or flutes to that shown in Figure 4.
Figure 10:
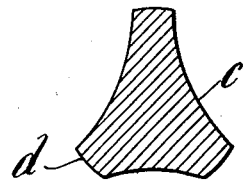

As shown in the drawings, Figures 1 to 3, the improved drill $a$ is provided with two or more flutes $b$ on the shank thereof, such flutes being cut deeply into the shank to leave a relatively thin core. The shape of the flutes $b$ is preferably such that the sides $c$ of the ridges $d$ formed thereby are concave, as shown in Figures 2, 3 and 8. Or such sides $c$ of the flutes $b$ may be rectilinear as shown in Figure 7.

At the bottom of each flute $b$ a groove $e$ is advantageously formed by the use of a milling cutter of a different curvature to the cutter used in forming the flutes $b$. Such grooves $e$ intersect the curved portions $c$ of the ridges and form cusps $f$, thereby also providing relatively narrow necks $g$ joining the ridges $d$ to the core.

The flutes $b$ and grooves $e$ preferably increase in depth towards the point $h$ of the drill, thus reducing the thickness of the ridges or lands $d$ at their cutting edges $i$.

In a modified form of the invention, as shown in Figures 4, 5, 6, 9, 10 and 11, the flutes $b$ may be of different depths so that the core or centre of inertia of a cross section of the drill is removed from the geometrical centre or centre of the envelope circle of the edges of the flutes.

Blows communicated to this modified form of drill by a manually operated or power driven hammer on the geometrical centre of the shank cause a vibratory action of the drill, resulting in the formation of a hole of greater clearance than would be formed by the use of a symmetrically fluted drill and this in itself results in less rapid wear on the outer edges or lands $d$ of the drill.

This vibratory action is moreover assisted by forming the drill with slightly twisted or helical ribs, as shown in the drawings, particularly in those cases where the drill is intended for use in a power hammer provided with a drill rotating mechanism, the direction of the flutes being such that the rotation of the drill effected by the hammer will promote the movement of the debris from the masonry along the flutes.

It has been the practice in some forms of percussion drill with ribs or lands of equal depth to grind the cutting edges so that the drill point is eccentric to the axis of the envelope cylinder of the ribs or lands with the object of ensuring that the position at which the drill point impacts with the masonry is constantly changing as the drill rotates, but the eccentricity in this case can be maintained only by repeated grinding, thus making it impossible to maintain exceptionally thin cutting edges.

The eccentric localisation of the point provided by thus grinding the cutting edges is essentially different in principle from that obtained in the improved form of drill in which the point $h$ always retains the same eccentric distance, i. e., is located at a point between the geometrical centre and the core or axis of inertia, however much wear may take place.

The improved method of grinding the flutes makes it possible to increase still further the cutting speed of the drill by progressively increasing the depth to which the latter is fluted towards the point $h$ of the drill and thus reducing the thickness of the ridges or lands $d$ at the cutting edges $i$.

By using the double milling method hereinabove described a reduction of the area of impact may be effected without substantially lessening the thickness of the ribs or lands $d$ at the outer edges, and an increased speed of drilling is thereby obtained without causing the drill to diminish in diameter by wearing away in use any more quickly than would otherwise be the case.

Figure 11:
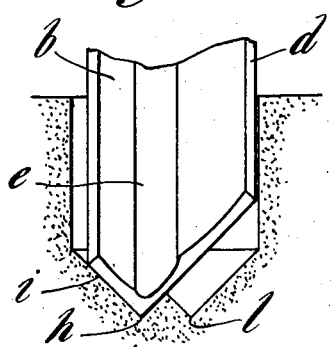
Figure 11 shows the point of the drill shown in Figure 4, entered into a hole formed by the use of such drill.
Figure 12:
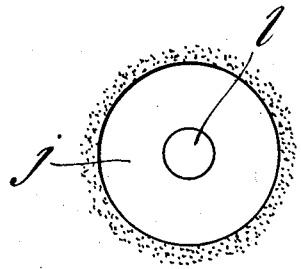
Figure 12 is a view showing the form of hole made by the use of drills as shown in Figure 4.

When in the ordinary use of the drill shown in Figures 4 to 6 or 9 to 11 for the purpose of cutting a hole $j$, Figures 11 and 12, a slow rotatory motion is imparted to the drill, the point $h$, which is eccentric to the envelope of the outer peripheries of the ridges $k$ which are not all of the same radial length, travels around a circular path whereby a cone $l$ of the material in which the hole is being cut is formed at the bottom of the hole. As the drill advances, this cone $l$ is progressively cut away by the cutting edges $i$ travelling around it.

I claim:

1. A percussion drill comprising a shank, an odd number of flutes formed helically in the shank, ribs formed on the shank by cutting said flutes, cutting edges formed on the ends of the ribs, and grooves cut centrally in the bottom parts of the flutes, each groove being bisected in a cross-section of the drill by the center line of an oppositely disposed rib.

2. A percussion drill comprising a shank, an odd number of flutes formed helically in the shank, ribs formed on the shank by cutting said flutes, one of said ribs being radially longer than the remaining ribs, cutting edges formed on the ends of the ribs, and grooves cut centrally in the bottom parts of the flutes, such grooves being so cut that in a cross-section of the drill each groove is bisected by the center line of an oppositely disposed rib.

3. A percussion drill comprising a shank, an odd number of flutes formed helically in the shank, said flutes increasing in depth towards the point of the drill, ribs formed on the shank by cutting said flutes, one of said ribs being radially longer than the remaining ribs, cutting edges formed on the ends of the ribs, and grooves cut centrally in the bottom parts of the flutes, such grooves being so cut that in a cross-section of the drill each groove is bisected by the center line of an oppositely disposed rib.

4. A percussion drill comprising a shank, an odd number of flutes cut centrally helically in the shank, grooves formed in the bottom parts of the flutes, ribs and a central core formed by the cutting of the flutes and the grooves, cutting edges formed on the ends of the ribs, said grooves being so cut that in a cross-section of the drill each groove is bisected by the center line of an oppositely disposed rib, and said core being eccentric to the envelope of the outer peripheries of the ribs.

5. A percussion drill comprising a shank, an odd number of flutes formed in the shank, one of such flutes being cut into the shank more deeply than the remaining flutes, grooves cut centrally in the bottom parts of the flutes, ribs formed on the shank by cutting the flutes, and cutting edges formed on the ends of the flutes, the cutting point of the drill being displaced from the geometric centre thereof and adapted to impact upon a different part of a hole at each percussive blow applied to the shank.

JOHN JOSEPH RAWLINGS.